US008700271B2

(12) United States Patent
Evenson et al.

(10) Patent No.: US 8,700,271 B2
(45) Date of Patent: Apr. 15, 2014

(54) MACHINE WITH FOUR DEGREES OF FREEDOM IMPLEMENT CONTROL JOYSTICK AND TRACK TYPE TRACTOR USING SAME

(75) Inventors: Richard Ryan Evenson, Apex, NC (US); Gregory A. Epplin, Apex, NC (US); Jason Mark Buckmier, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 13/367,603

(22) Filed: Feb. 7, 2012

(65) Prior Publication Data

US 2013/0204499 A1 Aug. 8, 2013

(51) Int. Cl.

| | |
|---|---|
| ***G06F 7/70*** | (2006.01) |
| ***G06F 19/00*** | (2011.01) |
| ***E02F 3/85*** | (2006.01) |
| ***B60K 26/00*** | (2006.01) |

(52) U.S. Cl.
USPC .............................. 701/50; 172/812; 180/333

(58) Field of Classification Search
USPC .............................. 701/50; 172/812; 180/333
See application file for complete search history.

(56) References Cited

U.S. PATENT DOCUMENTS

| | | | | |
|---|---|---|---|---|
| 3,700,044 | A | 10/1972 | Berg | |
| 3,774,696 | A | 11/1973 | Horsch | |
| 4,201,268 | A * | 5/1980 | Frisbee | 172/812 |
| 5,447,204 | A * | 9/1995 | Asal et al. | 172/821 |
| H1831 | H * | 2/2000 | Kelley et al. | 180/333 |
| 6,129,155 | A | 10/2000 | Lombardi | |
| 6,152,239 | A * | 11/2000 | Kelley et al. | 172/4.5 |
| 2010/0299031 | A1* | 11/2010 | Zhdanov et al. | 701/50 |

* cited by examiner

*Primary Examiner* — Behrang Badii
*Assistant Examiner* — Daniel L Greene
(74) *Attorney, Agent, or Firm* — Liell & McNeil

(57) ABSTRACT

A track type tractor incorporates control over lift, tilt, angle and pitch into an implement control joystick. The pitch cylinder and the tilt cylinder share segments of the hydraulic circuit, and a diverter valve prioritizes pitch control over tilt control in the rare occurrence when the operator is requesting both tilt and pitch changes to the dozer blade. Angle control and pitch control may be accomplished by finger controllers incorporated into the implement control joystick. Thus, the operator can control the dozer blade in four degrees of freedom without losing contact with the implement control joystick.

6 Claims, 3 Drawing Sheets

MACHINE WITH FOUR DEGREES OF FREEDOM IMPLEMENT CONTROL JOYSTICK AND TRACK TYPE TRACTOR USING SAME

TECHNICAL FIELD

The present disclosure relates generally to machines that have a hydraulically controlled implement manipulated by a joystick in an operator control station, and more particularly to a track type tractor that integrates dozer blade control over lift, tilt, angle and pitch into the implement control joystick.

BACKGROUND

Over the years, manufacturers have continued to add versatility to the control of implements attached to various machines. For instance, dozer blades attached to track type tractors originally only had control over lifting and lowering the blade. With time, additional control over tilting the blade about a fore-aft axis, angling the blade about an up-down axis, and pitching the blade about a left-right axis are additional capabilities that have been added to machines. In many such machines, the operator control station includes a conveyance control joystick on one side of the operator seat and an implement control joystick on the opposite side of the seat. The conveyance control joystick might be mounted on the left hand side and the implement control joystick mounted on the right hand side. In recent machines, the implement control joystick might be pivoted for and aft to lower and lift the blade, pivoted left and right to tilt the blade, and a thumb roller mounted on the joystick could be rotated to angle the blade. In the past, pitch control was generally accomplished by a turnbuckle mounted on the front of the machine, requiring the operator to stop the machine and manually rotate the turnbuckle in order to alter the pitch of the dozer blade. In more recent machines, a separate pitch cylinder might be mounted in place of a turnbuckle to control pitch, but a separate auxiliary valve of the hydraulic circuit was utilized to control pitch. For instance, pitch control might be plumbed into the hydraulic circuit by rerouting the hydraulic ports typically associated with the rear ripper to instead control the pitch cylinder. While utilizing the ripper hydraulic pathways to instead control pitch allowed the operator to control the dozer blade in four degrees of freedom without exiting the operator control station, control still required the operator to let go of the joystick and actuate the pitch control by a separate lever (ripper control lever) located in the operator control station.

Problems arise when there is a desire for the track type tractor to retain ripper hydraulic operation, but add blade pitch control without adding still another lever in the operator control station and providing hydraulic pathways to pitch control in a limited spatial envelope. The present disclosure is directed towards one or more of the problems set forth above.

SUMMARY

In one aspect, a track type tractor includes a machine body supported on a left side track and a right side track. An operator control station is supported on the machine body and includes a conveyance control joystick and an implement control joystick. A dozer blade is also attached to the machine body. A hydraulic circuit is supported on the machine body and includes a lift cylinder operably positioned to raise or lower the dozer blade with respect to the machine body, a tilt cylinder is operably positioned to rotate the dozer blade with respect to the machine body about a fore-aft axis, an angle cylinder operably positioned to rotate the dozer blade with respect to the machine body about an up-down axis, and a pitch cylinder operably positioned to rotate the dozer blade with respect to the machine body about a left-right axis. The hydraulic circuit also includes a hydraulic pump and a diverter valve. The diverter valve has a first configuration at which one of the tilt cylinder and the angle cylinder is fluidly connected to the hydraulic pump, but the pitch cylinder is blocked from the hydraulic pump, and a second configuration at which the one of the tilt cylinder and the angle cylinder is blocked from the hydraulic pump but the pitch cylinder is fluidly connected to the hydraulic pump. The diverter valve moves between the first configuration and the second configuration responsive to the implement control joystick.

In another aspect, a method of operating a track type tractor includes moving at least one of a left side track and a right side track responsive to changing a conveyance joystick of an operator control station. Raising or lowering a dozer blade relative to the machine body is accomplished with a lift cylinder by changing an implement controlled joystick of the operator control station. The dozer blade is tilted with a tilt cylinder about a fore-aft axis by changing the implement control joystick. The dozer blade is angled with an angle cylinder about an up-down axis by again changing the implement control joystick. The dozer blade is pitched with a pitch cylinder about a left-right axis by changing the implement control joystick. One of the tilting and the angling of the dozer blade is disabled with a diverter valve responsive to changing the implement control stick for pitching. The diverter valve is moved from a first configuration to a second configuration responsive to changing the implement control joystick for pitching.

In still another aspect, a machine includes a machine body supported on a conveyance. An operator control station is supported on the machine body and includes a conveyance control joystick and an implement control joystick. An implement is attached to the machine body. A hydraulic circuit is supported on the machine body and includes a first hydraulic actuator operably positioned to manipulate the implement with respect to the machine body in a first degree of freedom, a second hydraulic actuator operably positioned to manipulate the implement with respect to the machine body in a second degree of freedom, a third hydraulic actuator operably positioned to manipulate the implement with respect to the machine body in a third degree of freedom, and a fourth hydraulic actuator operably positioned to manipulate the implement with respect to the machine body in a fourth degree of freedom. The hydraulic circuit also includes a hydraulic pump and a diverter valve. The diverter valve has a first configuration at which the first hydraulic actuator is fluidly connected to the hydraulic pump but the second hydraulic actuator is blocked from the hydraulic pump, and a second configuration at which the first hydraulic actuator is blocked from the hydraulic pump but the second hydraulic actuator is fluidly connected to the hydraulic pump. The diverter valve moves between the first configuration and the second configuration responsive to the implement control joystick.

DETAILED DESCRIPTION

Figure 1:
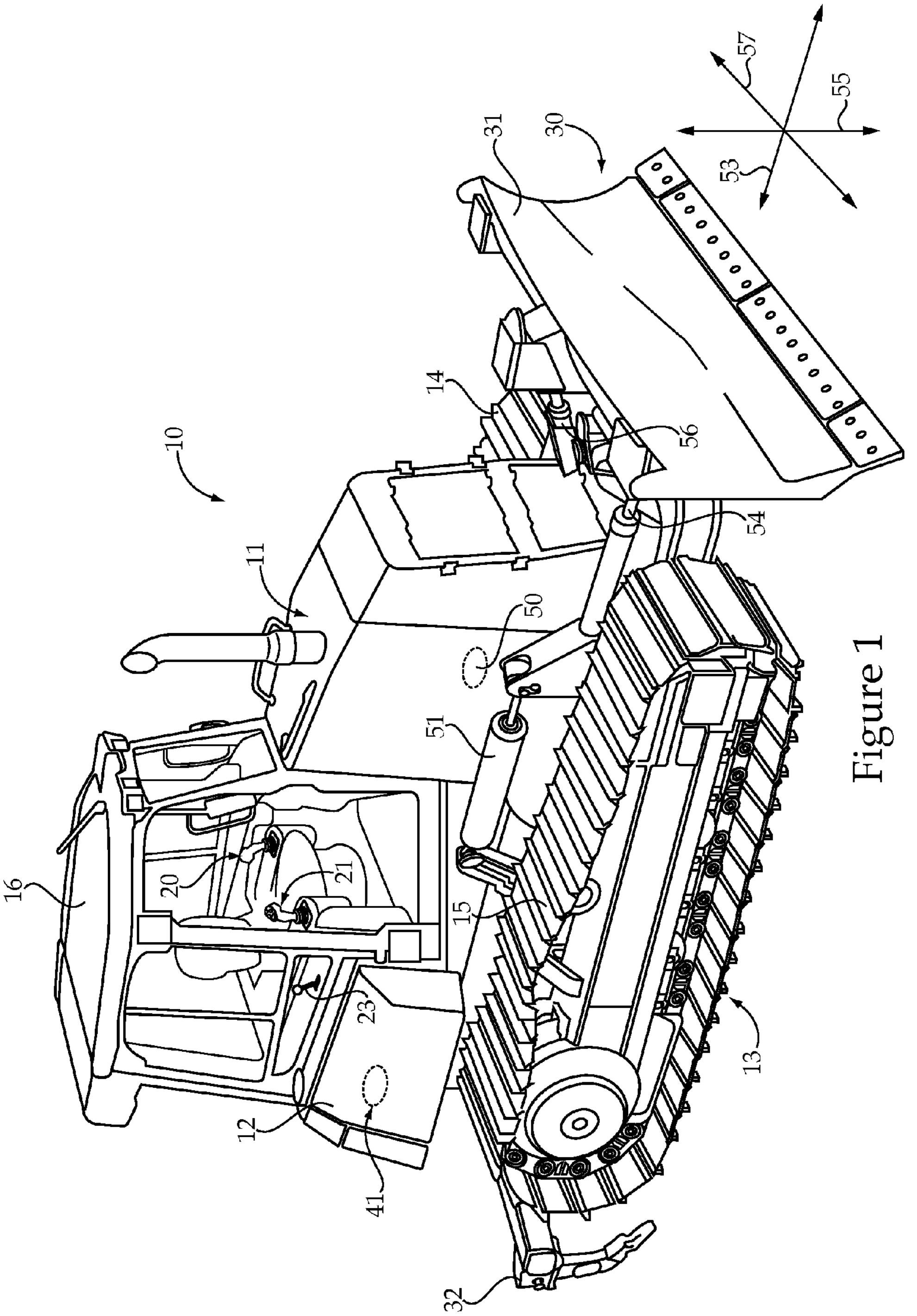
FIG. 1 is a perspective side view of a machine according to one aspect of the disclosure.

Referring to FIG. 1, a machine 10 includes an implement 30 that may be manipulated in four degrees of freedom via an implement control joystick 21 located in an operator control station 16. Although machine 10 is illustrated in the context of a track type tractor 11 with an implement 30 in the form of a dozer blade 31, the present disclosure may also find potential application to other machines that include one or more hydraulically actuated implements that could benefit from control in four different degrees of freedom via a single implement control joystick. For instance, the present disclosure might also find potential application in motor graders, timber harvesting equipment, excavators and many other machines known in the art. Although the conveyance 13 for machine 10 in the illustrated track type tractor 11 are tracks 14 and 15, other types of conveyances, such as wheels, would also fall within the intended scope of the present disclosure.

Track type tractor 11 includes a machine body 12 supported on a left side track 14 and a right side track 15. An operator control station 16 is supported on the machine body 12 and includes a conveyance control joystick 20, which may be located on the left side, and an implement control joystick 21, which may be located on the right hand side. A dozer blade 31 is attached to machine body 12 in a known manner. By manipulating implement control joystick 21, dozer blade 31 may be raised or lowered (first degree of freedom) with respect to machine body 12 by a lift cylinder(s) 51. The dozer blade 31 may be rotated about a fore-aft axis 53 (second degree of freedom) by a tilt cylinder 52, which is not visible in FIG. 1. The dozer blade 31 may also be rotated with respect to the machine body about an up-down axis 55 (third degree of freedom) by an angle cylinder(s) 54. Finally, dozer blade 31 may be rotated with respect to the machine body 12 about a left-right axis 57 (fourth degree of freedom) by a pitch cylinder 56. Although not necessary, the various hydraulic cylinders are controlled by an electronic controller 60 (FIG. 2) responsive to signals received by the electronic controller 60 from the implement control joystick 21. Nevertheless, direct control of hydraulic valves by the implement control joystick would also fall within the scope of the present disclosure apart from the control-by-wire structure of the preferred embodiment. Track type tractor 11 also includes a ripper 32 that may be raised and lowered by a separate hydraulic actuator (not visible) that is controlled by ripper control lever 23.

Figure 2:
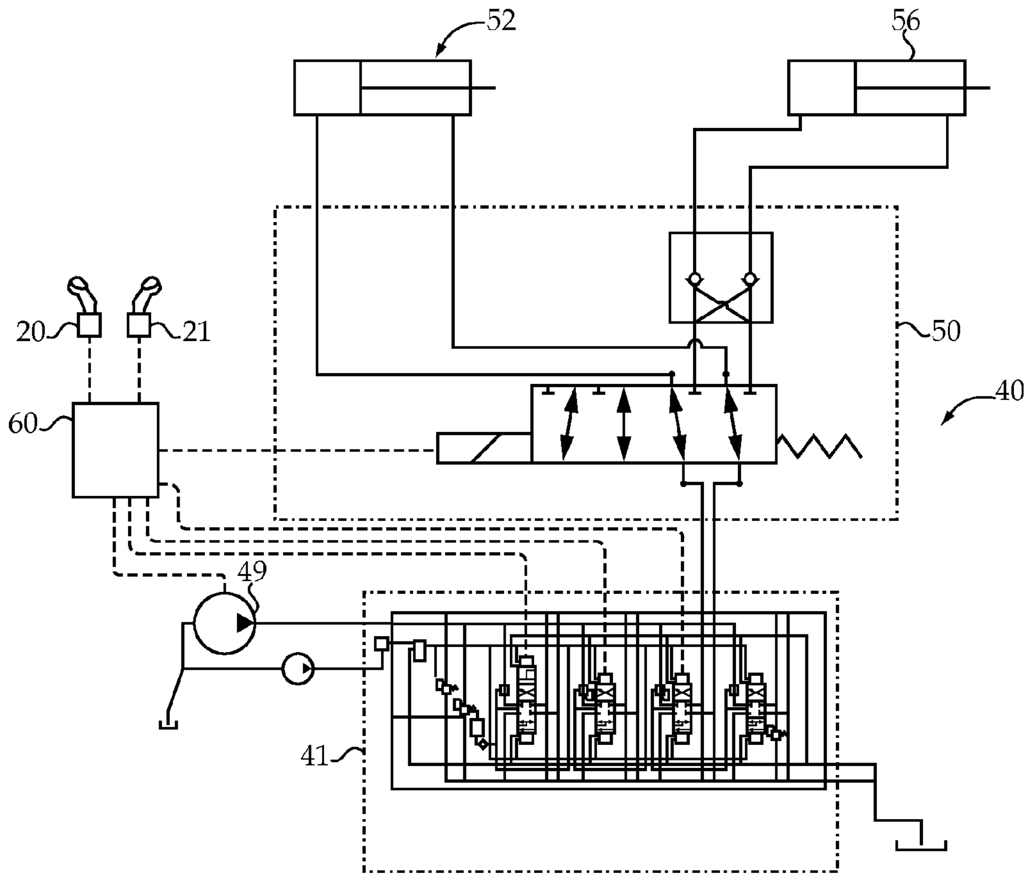
FIG. 2 is a portion of a hydraulic circuit schematic for the machine of FIG. 1.

Referring in addition to FIG. 2, a portion of the hydraulic circuit 40 for machine 10 is illustrated. Hydraulic circuit 40 includes lift cylinder 51, tilt cylinder 52, angle cylinder 54 and pitch cylinder 56, and is supported on machine body 12 in a conventional manner. The hydraulic circuit 40 also includes a main implement valve 41, which controls hydraulic fluid flow to and from the various implement hydraulic cylinders, a hydraulic pump 49 and a diverter valve 50. The diverter valve 50 serves as the means by which the tilt cylinder 52 and the pitch cylinder 56 can share portions of hydraulic circuit 40 due to the insight that operators rarely request both a tilt and pitch change to dozer blade 31 at the same time. Although the present disclosure is illustrated in the context of the pitch cylinder 56 and a tilt cylinder 52 sharing a portion of hydraulic circuit 40 via diverter valve 50, an alternate embodiment might have pitch cylinder 56 sharing a portion of hydraulic circuit 40 with the angle cylinder 54 substituted in place of tilt cylinder 52 in the schematic of FIG. 2. This alternative embodiment also recognizes that operators rarely request both a pitch change and a dozer blade angle change at the same time in most duty cycles.

The diverter valve 50 has a first configuration (as shown) at which the tilt cylinder 52 (or angle cylinder 54) fluidly connected to hydraulic pump 49 by way of main implement valve 41, and a second configuration at which the tilt cylinder 52 (or angle cylinder 54) is blocked from the hydraulic pump 49 but the pitch cylinder 56 is fluidly connected to the hydraulic pump 49, again via the main implement valve 41. The diverter valve 50 may be biased toward the first configuration, as shown, such as by a spring, but moves between the first configuration and the second configuration with an electronically controlled actuator responsive to the implement control joystick 21. In the disclosed embodiment, conveyance control joystick 20 and implement control joystick 21 are in control communication with the conveyance 13 and the dozer blade 31, respectively. In particular, the electronic controller 60 is in control communication between the hydraulic circuit 40 and the implement control joystick 21. Although the hydraulic circuit 40 is distributed over machine 10, potential locations for both the main diverter valve 41 and the diverter valve 50 are identified in FIG. 1.

Those skilled in the art will recognize that, depending upon how electronic controller 60 is programmed, the diverter valve 50 can prioritize operation of the tilt cylinder 52 relative to the pitch cylinder 56. In the illustrated embodiment, by biasing diverter valve 50 to fluidly connect tilt cylinder 52 to the main implement valve 41, the tilt function is normally available to the operator at all times. However, by executing an implement actuator prioritization algorithm 61 (FIG. 4) the electronic controller 60 may give priority to pitch control commands over tilt control in those rare instances when the operator is requesting a change in both pitch and tilt to dozer blade 31. Nevertheless, those skilled in the art will appreciate that the angle cylinder 54 could be substituted in place of tilt cylinder 52, the diverter valve 50 could be biased to favor the pitch cylinder as opposed to the biased shown favoring the tilt cylinder 52, and the prioritization algorithm 61 could prioritize tilt control (or angle control) over pitch control without departing from the scope of the present disclosure.

Figure 3:
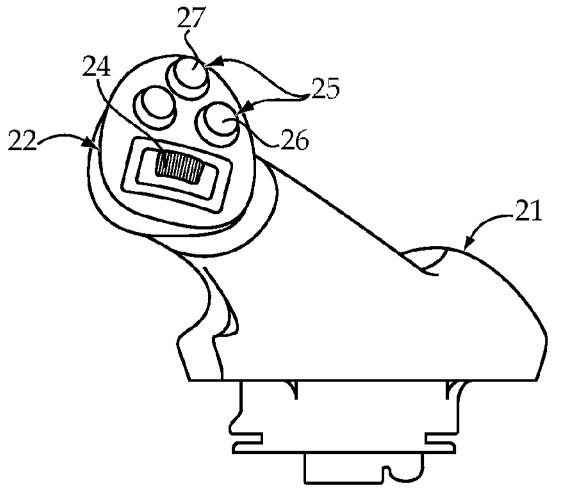
FIG. 3 is a side view of an implement control joystick for the machine of FIG. 1; and, FIG. 4 is a software logic flow diagram for an implement actuator prioritization algorithm for the machine of FIG. 1.

Referring in addition to FIG. 3, the implement control joystick 21 may signal the control changes of the present disclosure by utilizing increment and decrement button switches 25 for generating pitch control signals communicated to electronic controller 60. In particular, depressing button 26 could be interpreted by electronic controller 60 as a request to pitch dozer blade 31 rearwardly, whereas depression of button 27 would signal a request to pitch dozer blade 31 forward. Implement control joystick 21 may also include a thumb roller control 24 as a means by which angle control signals are communicated to electronic controller 60 for angling dozer blade 31 about up-down axis 55. Each of the finger controls 22 (24,25) may be manipulated by the operators thumb without losing contact or grip on implement control joystick 21. Although the present disclosure contemplates the use of thumb controls on implement control joystick 21, those skilled in the art will appreciate that other types of finger controls, such as index finger triggers would also fall within the scope of the present disclosure.

Figure 4:
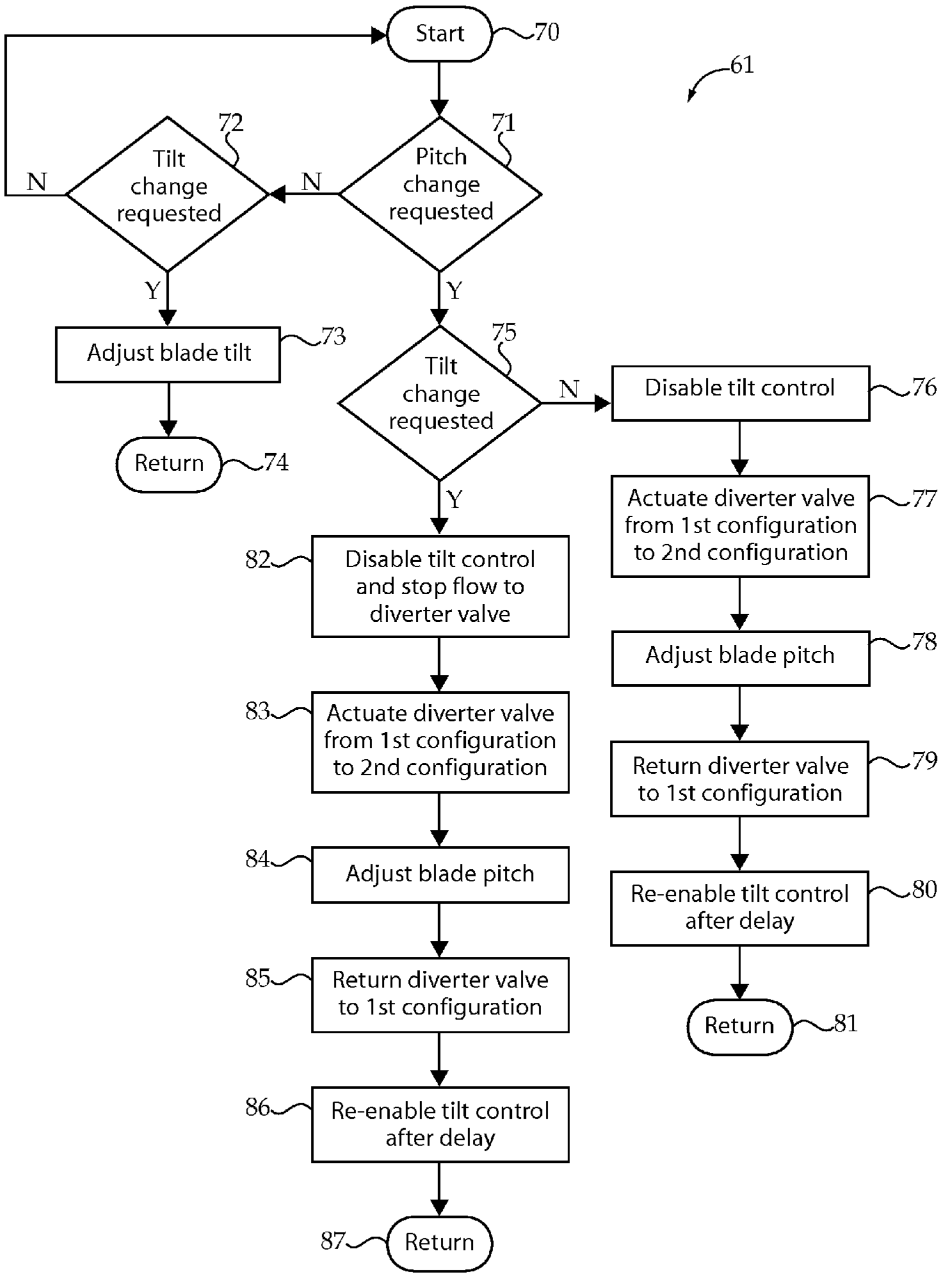

Referring in addition to FIG. 4, the implement actuator prioritization algorithm 61 (FIG. 4) may be configured to disable tilt control for a duration of a pitch control signal plus a settling delay time. In this way, any potential jerking motion of the tilt control can be avoided by allowing the diverter valve to switch between configurations without fluid flowing therethrough. After start 70, the algorithm queries whether a pitch change has been requested 71. In other words, the electronic controller 60 detects whether button 26 or button 27 are depressed. If not, the algorithm queries as to whether a tilt change has been requested. The tilt change would be indicated if the operator pivoted the implement control joystick 21 left or right. If no tilt change has been requested, the algorithm returns to start 70. If a tilt change is requested, electronic controller opens the appropriate valve in the main implement valve 41 to channel fluid from pump 49 to tilt cylinder 52. After the blade 31 tilt has been adjusted 73, the algorithm returns to start at 74. Back to query 71, if a pitch change is requested, the algorithm then queries at 75 whether a tilt change is also being requested. If no, electronic controller 60 disables tilt control at 76. Thus, at this point if the operator did pivot implement control joystick 21 left and right to request the tilt change, the electronic controller 60 would ignore that request until tilt control is re-enabled. At box 77, the diverter valve 50 is actuated to move from a first configuration to a second configuration. It may be noteworthy that may not be desirable for any fluid flow to pass through diverter valve 50 when moving between configurations. At box 78, the blade pitch is adjusted by electronic controller 60 commanding the tilt valve in the main implement valve 41 to channel fluid from pump 49 to the pitch cylinder 56. After the blade pitch has been adjusted at 78, the fluid flow through diverter valve 50 is ended and the diverter valve is allowed return back to its first configuration under a bias at box 79. At box 80, electronic controller 60 re-enables tilt control after a delay so that no fluid is flowing through diverter valve 50 when it is moved back to its first configuration so that no sudden small change in the tilt cylinder occurs. At 81 the logic returns to start 70. Back to query 75, if a tilt change has been requested at the same time a pitch change has been requested, the electronic controller 60 will terminate the tilt control change as it has already begun, and stop hydraulic fluid flow through diverter valve 50 at box 82. At box 83, electronic control 60 actuates diverter valve 50 to move from its first configuration to its second configuration. At box 84, the blade pitch is adjusted by electronic controller 60 actuating the appropriate valve and main implement valve 41 (tilt) to channel fluid flow from pump 49 to the pitch cylinder 56. After the pitch change has occurred and fluid flow through diverter valve 50 has ended, the diverter valve is allowed to return into its first configuration under a bias at box 85. At box 86, tilt control is re-enabled after a delay. Finally, the logic returns to start at 87.

INDUSTRIAL APPLICABILITY

Although the present disclosure is illustrated in the context of a track type tractor 11 utilizing a dozer blade 31, the present disclosure could find potential application in other machines that utilize different implements in up to four degrees of freedom, or more, with respect to the machine body 12. In the illustrated embodiment, these four degrees of freedom include lift, tilt, angle and pitch. These control actions are accomplished with first, second, third and fourth hydraulic actuators, which are identified in this disclosure as the lift cylinder 51, tilt cylinder 52, angle cylinder 54 and pitch cylinder 56, respectively. By sharing two of the degrees of control, such as tilt and pitch, on the same portions of the hydraulic circuit 40, valuable space in and around machine body 12 is conserved by avoiding independent hydraulic lines and fittings. This concept leverages the insight that two of the control functions are rarely requested simultaneously by an operator. Therefore, an operator controlling track type tractor 11 in typical duty cycles will be often be unaware that the tilt control function is disabled when the operator requests pitch control changes. In addition, all this may be accomplished while retaining control over ripper 32.

When track type tractor 11 is operating, the operator may move the machine 10 by rotating at least one of the left side track and the right side track 15 responsive to changing the conveyance control joystick 20 of the operator control station 16. For instance, pivoting conveyance control joystick left or right can facilitate a turn, forward pivot could cause the machine to move forward, and backward pivot could cause the machine to move in reverse. Those skilled in the art will appreciate that movement of conveyance control joystick merely transmits control signals to electronic controller 60, which are then interpreted and then separate control signals are communicated from electronic controller 60 to various electronically controlled actuators known in the art to facilitate conveyance of machine 10 in a known manner.

The operator may raise or lower the dozer blade 31 relative to machine body 12 with lift cylinder(s) 51 by changing the implement control joystick 21 via a pivoting action backwards and forwards, in a known manner. The operator may command a tilting of the dozer blade 31 with the tilt cylinder 52 by changing the implement control joystick 21, such as by pivoting to the left or right. The operator may change an angle of dozer blade 31 with angle cylinder 54 by changing the implement control stick through rotation of thumb control roller 24. Although not readily apparent, the rotation axis of thumb control roller 24 may be aligned with the up-down axis 55 so that angle control of dozer blade 31 is more intuitive to the operator. Finally, pitch control of dozer blade 31 can be accomplished with the pitch cylinder 56 by changing the implement control stick 21 through depression of thumb button control 26 or 27.

By programming electronic controller as shown in the logic diagram of FIG. 4, priority is given to pitch control signals over tilt control signals, in the rare event that an operator is requesting both tilt and pitch simultaneously. Furthermore, electronic controller 60 may be equipped with delay protocols so that hydraulic fluid is not flowing through diverter valve 50 when it is moving between its first and second configurations so that no undesirable sudden movement of either tilt cylinder 51 or pitch cylinder 56 occurs. Thus the tilting control function may be disabled when the implement control joystick 21 is changed to reflect a pitching control signal via depression of thumb control button 26 or 27. Likewise, the diverter valve 50 will move from its first configuration toward its second configuration responsive to the implement control joystick 21 being changed for pitching.

In the illustrated embodiment, when a pitch movement is requested by the operator, the electronic controller 60 will disable any tilt command, and may cancel any remaining blade shake duration if the machine is so equipped. When tilt and/or blade shake are disabled, a short delay may be programmed to allow all tilt motion to cease prior to actuating the diverter valve 50 to redirect flow from the tilt cylinder 52 to the pitch cylinder 56. Thereafter, electronic controller 60 may apply a short delay at the end of the control change to pitch cylinder 56 to delay availability of control over the tilt cylinder 52 to avoid sudden tilt movements. This also allows the diverter valve 50 to return to its initial first configuration before tilt commands are again available.

Because the volume of hydraulic fluid utilized control tilt and pitch may be different, and because pitch control may utilize the tilt control valve solenoid in the main implement valve 41, electronic controller 60 may limit hydraulic flow to less than 100% through the main implement valve 41 to provide better pitch control. Pitch changes may require a lessor volume of fluid to respectively change pitch in a range typically encountered in most duty cycles. When the pitch control button 26 or 27 is released, the electronic controller 60 may ramp down command to the appropriate blade tilt solenoid in the main implement valve 41, deactivate the diverter valve 50 to allow it to return to its first configuration under a bias, apply a short delay to allow the diverter valve 50 to switch states, and then resume normal tilt control availability. If so equipped, since any remaining blade shake duration may have been cancelled when a pitch command was received by electronic controller 60, the operator would have to re-command blade shake if that function is available and was desired. It may also be desirable to allow the various delays to operate the diverter valve 50 and return it to its original configuration to be adjustable, such as via a service tool to program different machines differently in the field.

If the operator requests a blade tilt function using the implement control joystick and simultaneously requests a pitch change, electronic controller 60 will give priority to the pitch control request. The electronic controller 60 may also be programmed to inhibit pitch requests in those rare cases where both pitch control buttons 26 and 27 happen to be depressed simultaneously. A short delay may then occur after release of the buttons before re-enabling the pitch control function. Those skilled in the art will also recognize the electronic controller 60 may disable pitch control in the event that a fault is detected that affects pitch control somewhere in the system.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A track type tractor comprising:

a machine body supported on a left side track and a right side track; an operator control station supported on the machine body and including a conveyance control joystick and an implement control joystick; a dozer blade attached to the machine body;

a hydraulic circuit supported on the machine body and including a lift cylinder operably positioned to raise or lower the dozer blade with respect to the machine body, a tilt cylinder operably positioned to rotate the dozer blade with respect to the machine body about a fore-aft axis, an angle cylinder operably positioned to rotate the dozer blade with respect to the machine body about an up-down axis, a pitch cylinder operably positioned to rotate the dozer blade with respect to the machine body about a left-right axis, a hydraulic pump and a diverter valve;

wherein the diverter valve has a first configuration at which one of the tilt cylinder and the angle cylinder is fluidly connected to the hydraulic pump but the pitch cylinder is blocked from the hydraulic pump, and a second configuration at which the one of the tilt cylinder and the angle cylinder is blocked from the hydraulic pump but the pitch cylinder is fluidly connected to the hydraulic pump;

wherein the diverter valve moves between the first configuration and the second configuration responsive to the implement control joystick; and an electronic controller in control communication between the hydraulic circuit and the implement control joystick, the electronic controller being operable to execute an implement actuator prioritization algorithm configured to ignore one of a tilt control signal and an angle control signal for a duration of a pitch control signal plus a settling delay time, while limiting a hydraulic flow to less than 100% to the pitch cylinder.

2. The track type tractor of claim 1 wherein the diverter valve is biased toward the first configuration.

3. The track type tractor of claim 1 wherein the diverter valve prioritizes the tilt cylinder relative to the pitch cylinder.

4. The track type tractor of claim 3 wherein the diverter valve is biased toward the first configuration.

5. The track type tractor of claim 4 including an electronic controller in control communication between the hydraulic circuit and the implement control joystick; and the electronic controller being operable to execute an implement actuator prioritization algorithm configured to ignore a tilt control signal for a duration of a pitch control signal plus a settling delay time.

6. The track type tractor of claim 5 wherein the implement control joystick includes a thumb control operably coupled to the pitch cylinder by the electronic controller.

* * * * *